(12) United States Patent
Keller et al.

(10) Patent No.: US 7,998,451 B2
(45) Date of Patent: Aug. 16, 2011

(54) SULFUR DEGASSING PROCESS

(75) Inventors: Alfred E. Keller, Ponca City, OK (US);
Nathan A. Hatcher, Buda, TX (US);
Sriram Ramani, Katy, TX (US); Terry D. Pruitt, Ponca City, OK (US);
Michael D Smith, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 387 days.

(21) Appl. No.: 12/346,347

(22) Filed: Dec. 30, 2008

(65) Prior Publication Data

US 2010/0163401 A1    Jul. 1, 2010

(51) Int. Cl.
*C01B 17/027* (2006.01)
(52) U.S. Cl. .................................................. 423/578.1
(58) Field of Classification Search ............... 423/578.1
See application file for complete search history.

(56) References Cited

U.S. PATENT DOCUMENTS

| | | | | |
|---|---|---|---|---|
| 3,102,792 A | * | 9/1963 | Eads et al. | 23/294 S |
| 3,397,041 A | * | 8/1968 | Rivers | 23/294 S |
| 3,838,979 A | * | 10/1974 | Sims | 23/293 S |
| 4,764,192 A | * | 8/1988 | Heisel et al. | 96/201 |
| 5,935,548 A | | 8/1999 | Franklin et al. | |
| 6,569,398 B2 | | 5/2003 | Fenderson | |

OTHER PUBLICATIONS

P.D. Clark, K.L. Lesage, T. McDonald, A. Mason and A.K. Neufeld, "Investigations Into the Chemical Mechanisms of Liquid Sulfur Degassing and Their Relevance to Industrial Degassing Systems", Alberta Sulfur Research Ltd., Quarterly Bulletin, Apr.-Jun. 1994, vol. XXXI, No. 1, pp. 23-64.

P.D. Clark, K. L. Lesage, E. Fitzpatrick and P.M. Davis, "H2S Solubility in Liquid Sulfur as a Function of Temperature and H2S Gas Phase Partial Pressure", Alberta Sulphur Research Ltd., Quarterly Bulletin, Oct.-Dec. 1997, vol. XXXIV, No. 1, pp. 1-19.

* cited by examiner

*Primary Examiner* — Timothy Vanoy

(57) ABSTRACT

A process is disclosed for removing hydrogen sulfide from liquid sulfur including: passing a liquid sulfur feed comprising liquid sulfur and hydrogen sulfide to a vaporizer; vaporizing at least a portion of the liquid sulfur feed in the vaporizer to thereby form a first vapor stream comprising gaseous sulfur and gaseous hydrogen sulfide; partially condensing the first vapor stream in a condenser to form a liquid product stream comprising liquid sulfur and a second vapor stream comprising hydrogen sulfide; wherein the liquid product stream has a lower concentration of hydrogen sulfide than the liquid sulfur feed.

11 Claims, 2 Drawing Sheets

SULFUR DEGASSING PROCESS

The present invention relates to a process for the degassing of liquid sulfur. In another aspect, this invention relates to a process for the removal of hydrogen sulfide from liquid sulfur using vaporization followed by condensation.

Since the presence of hydrogen sulfide in liquid sulfur can cause serious safety and health problems, as well as downstream processing issues, there is an incentive to remove hydrogen sulfide from liquid sulfur.

Therefore, development of an improved process for effectively removing hydrogen sulfide from liquid sulfur would be a significant contribution to the art.

BRIEF SUMMARY OF THE INVENTION

In accordance with the present invention, a process is provided including the following:

passing a liquid sulfur feed comprising liquid sulfur and hydrogen sulfide to a vaporizer;

vaporizing at least a portion of the liquid sulfur feed in the vaporizer to thereby form a first vapor stream comprising gaseous sulfur and gaseous hydrogen sulfide;

partially condensing the first vapor stream in a condenser to form a liquid product stream comprising liquid sulfur and a second vapor stream comprising hydrogen sulfide; wherein the liquid product stream has a lower concentration of hydrogen sulfide than the liquid sulfur feed.

DETAILED DESCRIPTION OF THE INVENTION

The liquid sulfur feed of this invention can be any liquid sulfur stream which comprises, consists of, or consists essentially of liquid sulfur and hydrogen sulfide. Most typically, the liquid sulfur feed is generated from a sulfur recovery unit wherein hydrogen sulfide is combusted with oxygen to form gaseous sulfur and sulfur dioxide, and non-combusted hydrogen sulfide is reacted with the sulfur dioxide to form additional gaseous sulfur which is eventually liquefied.

At least a portion of the liquid sulfur feed is vaporized in a vaporizer to thereby form a first vapor stream comprising, consisting of, or consisting essentially of gaseous sulfur and gaseous hydrogen sulfide. Preferably, at least about 70%, more preferably at least about 80%, and most preferably at least about 90% of the liquid sulfur feed is vaporized in the vaporizer. The liquid sulfur feed is preferably heated in the vaporizer.

The first vapor stream is partially condensed in a condenser to form a liquid product stream comprising, consisting of, or consisting essentially of liquid sulfur and a second vapor stream comprising, consisting of, or consisting essentially of hydrogen sulfide. The liquid product stream has a lower concentration of hydrogen sulfide than the liquid sulfur feed. Preferably, the hydrogen sulfide concentration in the liquid product stream is less than about 50 wt. % of the hydrogen sulfide concentration in the liquid sulfur feed, more preferably less than about 20 wt. % of the hydrogen sulfide concentration in the liquid sulfur feed, and most preferably less than about 10 wt. % of the hydrogen sulfide concentration in the liquid sulfur feed.

The liquid sulfur feed is preferably vaporized at a pressure below atmospheric, more preferably below about 3.0 psia, and most preferably below about 0.6 psia; and at a temperature between about 450° F. to about 1000° F., and more preferably at a temperature between about 600° F. to about 950° F.

The first vapor stream is preferably condensed at a temperature between about 250° F. and about 310° F., more preferably between about 260° F. and about 300° F.

A first embodiment of the present invention will be described with reference to FIG. 1.

Figure 1:
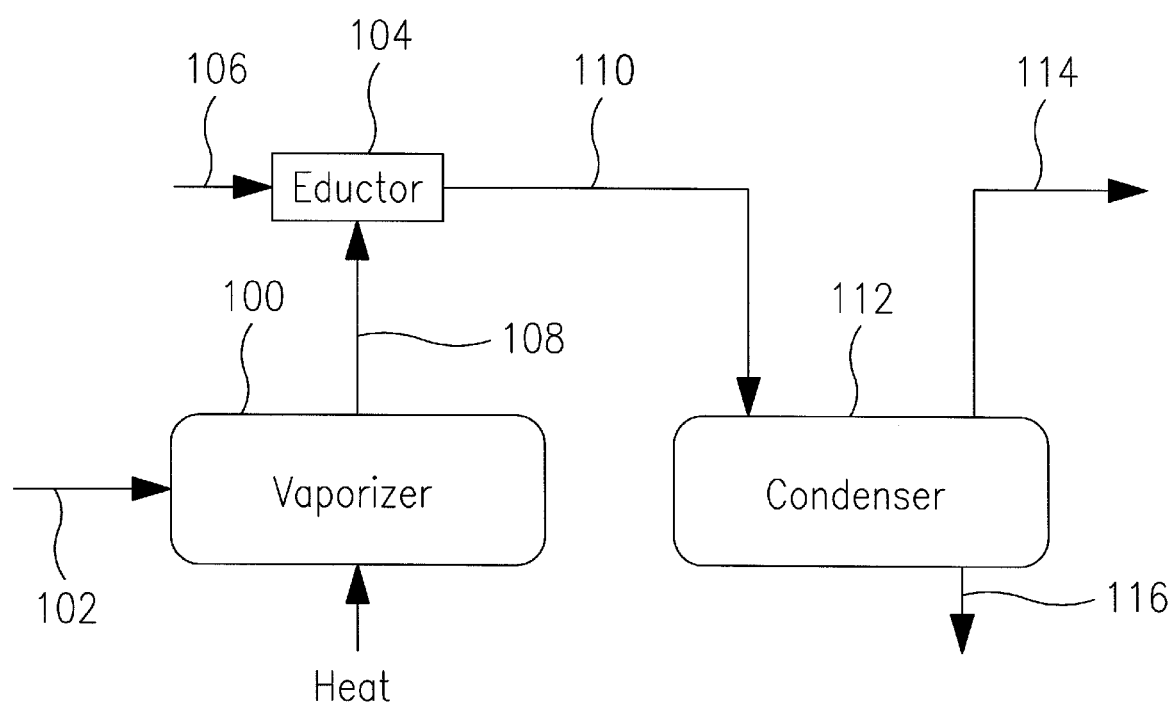
FIG. 1 is a simplified schematic flow diagram presenting an embodiment of the present invention.

Referring to FIG. 1, the liquid sulfur feed is passed to a vaporizer 100 by line 102. At least a portion of the liquid sulfur feed in vaporizer 100 is vaporized to thereby form the first vapor stream. Steam is passed to an eductor 104 by line 106. The first vapor stream is educted from vaporizer 100, and into the steam passing through eductor 104, by line 108 which connects eductor 104 with vaporizer 100 in fluid flow communication. The eduction of the first vapor stream thereby results in a pressure below atmospheric in vaporizer 100 and a lower hydrogen sulfide partial pressure of the combination of the first vapor stream and the steam leaving eductor 104 by line 110. Preferably, the hydrogen sulfide partial pressure of the combination of the first vapor stream and said steam leaving eductor 104 is less than 80%, more preferably less than 60%, and most preferably less than 40% of the hydrogen sulfide partial pressure of the first vapor stream leaving vaporizer 100.

Line 110 connects eductor 104 in fluid flow communication with a condenser 112, passing the combined first vapor stream and steam from eductor 104 to condenser 112. The first vapor stream is partially condensed in condenser 112 to form the liquid product stream and the second vapor stream. The second vapor stream is removed from condenser 112 by line 114, and the liquid product stream is removed from condenser 112 by line 116. The liquid product stream has a lower concentration of hydrogen sulfide than the liquid sulfur feed.

A second embodiment of the present invention will be described with reference to FIG. 2.

Figure 2:
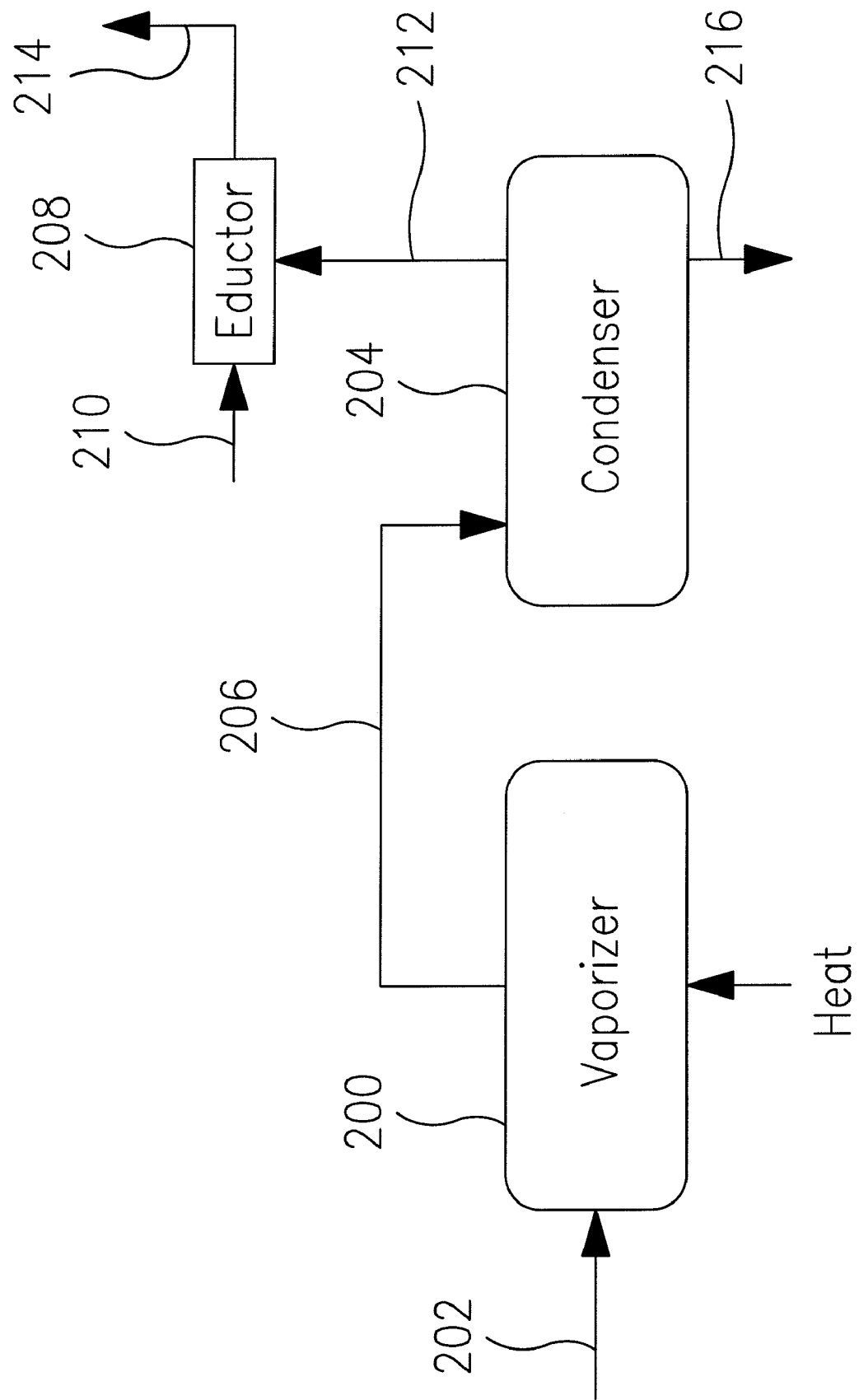
FIG. 2 is a simplified schematic flow diagram presenting an embodiment of the present invention.

Referring to FIG. 2, the liquid sulfur feed is passed to a vaporizer 200 by line 202. At least a portion of the liquid sulfur feed in vaporizer 200 is vaporized to thereby form the first vapor stream. The first vapor stream is passed to a condenser 204 by a line 206 which connects vaporizer 200 in fluid flow communication with condenser 204. The first vapor stream is partially condensed in condenser 204 to form the liquid product stream and the second vapor stream.

Steam is passed to an eductor 208 by line 210. The second vapor stream is educted from condenser 204, and into the steam passing through eductor 208, by line 212 which connects condenser 204 with eductor 208 in fluid flow communication. The eduction of the second vapor stream thereby results in pressures below atmospheric in vaporizer 200 and in condenser 204.

The second vapor stream, along with the steam, is removed from eductor 208 by line 214, and the liquid product stream is removed from condenser 204 by line 216. The liquid product stream has a lower concentration of hydrogen sulfide than the liquid sulfur feed.

The following example is provided to further illustrate this invention and is not to be considered as unduly limiting the scope of this invention.

EXAMPLE

In six separate experiments, liquid sulfur feeds containing hydrogen sulfide were vaporized and condensed, forming liquid product streams. The results are shown in the Table below, and demonstrate the effectiveness of the present invention in lowering hydrogen sulfide concentrations in liquid sulfur.

TABLE

| Liquid Sulfur Feed Flow g/min | Liquid Sulfur Feed $H_2S$ Conc. ppm | $N_2$ Flow mL/min | Volatilization Temp ° F. | Condenser Temp ° F. | Liquid sulfur Product $H_2S$ Conc. ppm |
|---|---|---|---|---|---|
| 0.436 | $^a$390 ± 25 | 10 | 932 | 275 | 11.6 |
| 0.954 | $^a$390 ± 25 | 10 | 932 | 275 | 16.0 |
| 1.54  | $^a$390 ± 25 | 10 | 932 | 275 | 21.8 |
| 1.63  | $^a$390 ± 25 | 10 | 932 | 275 | 18.4 |
| 1.01  | 405 | 10 | 932 | 275 | 15.7 |
| 0.99  | 405 | 10 | 932 | 275 | 16.5 |

$^a$These four experiments were performed during a continuous flow period where the feed $H_2S$ concentration was reduced from 408 to 373 ppm over the course of all four measurements.

While this invention has been described in detail for the purpose of illustration, it should not be construed as limited thereby but intended to cover all changes and modifications within the spirit and scope thereof.

That which is claimed:

1. A process for removing hydrogen sulfide from liquid sulfur comprising:
    passing a liquid sulfur feed comprising liquid sulfur and hydrogen sulfide to a vaporizer;
    vaporizing at least a portion of said liquid sulfur feed in said vaporizer to form a first vapor stream comprising gaseous sulfur and gaseous hydrogen sulfide;
    partially condensing said first vapor stream in a condenser to form a liquid product stream comprising liquid sulfur and a second vapor stream comprising hydrogen sulfide, wherein said liquid product stream has a lower concentration of hydrogen sulfide than said liquid sulfur feed,
    wherein an eductor is connected in fluid flow communication with said vaporizer and with said condenser,
    wherein steam is passed through said eductor,
    wherein said first vapor stream is educted from said vaporizer into said steam passing through said eductor, thereby resulting in a pressure below atmospheric in said vaporizer and a lower hydrogen sulfide partial pressure,
    wherein said first vapor stream and said steam are passed to said condenser.

2. The process of claim 1 wherein said liquid sulfur feed is heated in said vaporizer.

3. The process of claim 1 wherein said liquid sulfur feed is vaporized at a pressure below about 3.0 psia and at a temperature between about 450° F. to about 1000° F.; and wherein said first vapor stream is condensed at a temperature between about 250° F. and about 310° F.

4. The process of claim 1 wherein said liquid sulfur feed is vaporized at a pressure below about 0.6 psia and at a temperature between about 600° F. to about 950° F.; and wherein said first vapor stream is condensed at a temperature between about 260° F. and about 300° F.

5. The process of claim 1 wherein the hydrogen sulfide partial pressure of the combination of said first vapor stream and said steam leaving said eductor is less than 80% of the hydrogen sulfide partial pressure of said first vapor stream leaving said vaporizer.

6. The process of claim 1 wherein the hydrogen sulfide partial pressure of the combination of said first vapor stream and said steam leaving said eductor is less than 60% of the hydrogen sulfide partial pressure of said first vapor stream leaving said vaporizer.

7. The process of claim 1 wherein the hydrogen sulfide partial pressure of the combination of said first vapor stream and said steam leaving said eductor is less than 40% of the hydrogen sulfide partial pressure of said first vapor stream leaving said vaporizer.

8. A process for removing hydrogen sulfide from liquid sulfur comprising:
    passing a liquid sulfur feed comprising liquid sulfur and hydrogen sulfide to a vaporizer;
    vaporizing at least a portion of said liquid sulfur feed in said vaporizer to form a first vapor stream comprising gaseous sulfur and gaseous hydrogen sulfide;
    partially condensing said first vapor stream in a condenser to form a liquid product stream comprising liquid sulfur and a second vapor stream comprising hydrogen sulfide, wherein said liquid product stream has a lower concentration of hydrogen sulfide than said liquid sulfur feed,
    wherein an eductor is connected in fluid flow communication with said condenser,
    wherein steam is passed through said eductor,
    wherein said second vapor stream is educted from said condenser into said steam passing through said eductor, thereby resulting in pressures below atmospheric in said vaporizer and in said condenser.

9. The process of claim 8 wherein said liquid sulfur feed is heated in said vaporizer.

10. The process of claim 8 wherein said liquid sulfur feed is vaporized at a pressure below about 3.0 psia and at a temperature ranging between about 450° F. to about 1000° F., and wherein said first vapor stream is condensed at a temperature between about 250° F. and about 310° F.

11. The process of claim 8 wherein said liquid sulfur feed is vaporized at a pressure below about 0.6 psia and at a temperature ranging between about 600° F. to about 950° F. and wherein said first vapor stream is condensed at a temperature between about 260° F. and about 300° F.

* * * * *